United States Patent
Narayanan et al.

(10) Patent No.: US 12,284,283 B2
(45) Date of Patent: Apr. 22, 2025

(54) AUTHENTICATING OWNERSHIP OF DIGITAL OBJECTS IN ONLINE MARKETPLACES

(71) Applicant: T-Mobile USA, Inc., Bellevue, WA (US)

(72) Inventors: Rajesh Kalathil Narayanan, Bellevue, WA (US); Praveen Sattaru, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 295 days.

(21) Appl. No.: 18/147,610

(22) Filed: Dec. 28, 2022

(65) Prior Publication Data

US 2024/0223371 A1 Jul. 4, 2024

(51) Int. Cl.
*H04L 9/32* (2006.01)
*G06Q 30/0601* (2023.01)
*H04L 9/00* (2022.01)

(52) U.S. Cl.
CPC ....... *H04L 9/3213* (2013.01); *G06Q 30/0601* (2013.01); *H04L 9/3236* (2013.01); *H04L 9/50* (2022.05)

(58) Field of Classification Search
CPC ........ H04L 9/3213; H04L 9/50; H04L 9/3236
USPC .......................................................... 726/9
See application file for complete search history.

(56) References Cited

U.S. PATENT DOCUMENTS

| | | | | |
|---|---|---|---|---|
| 11,783,011 | B1 * | 10/2023 | Lipton | G06F 21/10 |
| | | | | 726/26 |
| 2017/0352012 | A1 * | 12/2017 | Hearn | H04L 9/3247 |
| 2017/0353309 | A1 * | 12/2017 | Gray | G06F 21/51 |
| 2018/0137512 | A1 * | 5/2018 | Georgiadis | H04L 63/08 |
| 2020/0250719 | A1 * | 8/2020 | Shah | G06Q 30/0605 |
| 2021/0082044 | A1 * | 3/2021 | Sliwka | H04L 9/3255 |
| 2023/0267450 | A1 * | 8/2023 | Bathen | G06Q 20/389 |
| | | | | 705/66 |

OTHER PUBLICATIONS

Gayathri et al., "Artify—An Artistic NFT Marketplace," 2024 IEEE Students Conference on Engineering and Systems (SCES), Prayagraj, India, 2024, pp. 1-6, doi: 10.1109/SCES61914.2024.10652284. (Year: 2024).*

(Continued)

*Primary Examiner* — Peter C Shaw
(74) *Attorney, Agent, or Firm* — Perkins Coie LLP

(57) ABSTRACT

A digital object is associated with a smart contract that stores a first hash value to represent a user device used to acquire ownership of the digital object. When a request to transfer ownership of the digital object from a first user to a second user is received, a user account of the first user is accessed to retrieve information identifying a user device associated with the user account of the first user. The first hash value in the smart contract is authenticated based on the information representing the first user's device. If the first hash value is determined to match the user device information stored in the first user's account, a token representing the digital object is transferred to a wallet associated with the second user. The smart contract is updated to include a second hash value that represents a user device used by the second user to request the ownership transfer of the digital object.

20 Claims, 8 Drawing Sheets

(56) References Cited

OTHER PUBLICATIONS

Kusuma et al., "Digital Artwork Marketplace Web Application Design using Blockchain Technology," 2023 International Conference on Information Management and Technology (ICIMTech), Malang, Indonesia, 2023, pp. 493-498, doi: 10.1109/ICIMTech59029.2023.10277875. (Year: 2023).*

Behera et al., "Proposal of User-Friendly Design of NFT Marketplace," 2023 4th International Conference on Computing and Communication Systems (I3CS), Shillong, India, 2023, pp. 1-6, doi: 10.1109/I3CS58314.2023.10127468. (Year: 2023).*

Nair et al., "Web3.0 and NFTs: Exploring the Future of Digital Asset Ownership," 2024 10th International Conference on Advanced Computing and Communication Systems (ICACCS), Coimbatore, India, 2024, pp. 1391-1396, doi: 10.1109/ICACCS60874.2024.10717229. (Year: 2024).*

\* cited by examiner

AUTHENTICATING OWNERSHIP OF DIGITAL OBJECTS IN ONLINE MARKETPLACES

BACKGROUND

In an online environment where digital content can be infinitely replicated and distributed freely, identifying an owner of a digital content item is difficult. Non-fungible tokens have been offered as a solution to the challenges of establishing ownership over digital content. Using an NFT approach, a person demonstrates his or her ownership of a digital content item by possessing a unique token pointing to the digital content item. However, if a person's token is compromised or stolen by another user, the other user can freely transact with the token as if the other user is the token's proper owner.

BRIEF DESCRIPTION OF THE DRAWINGS

Detailed descriptions of implementations of the present invention will be described and explained through the use of the accompanying drawings.

Figure 1:
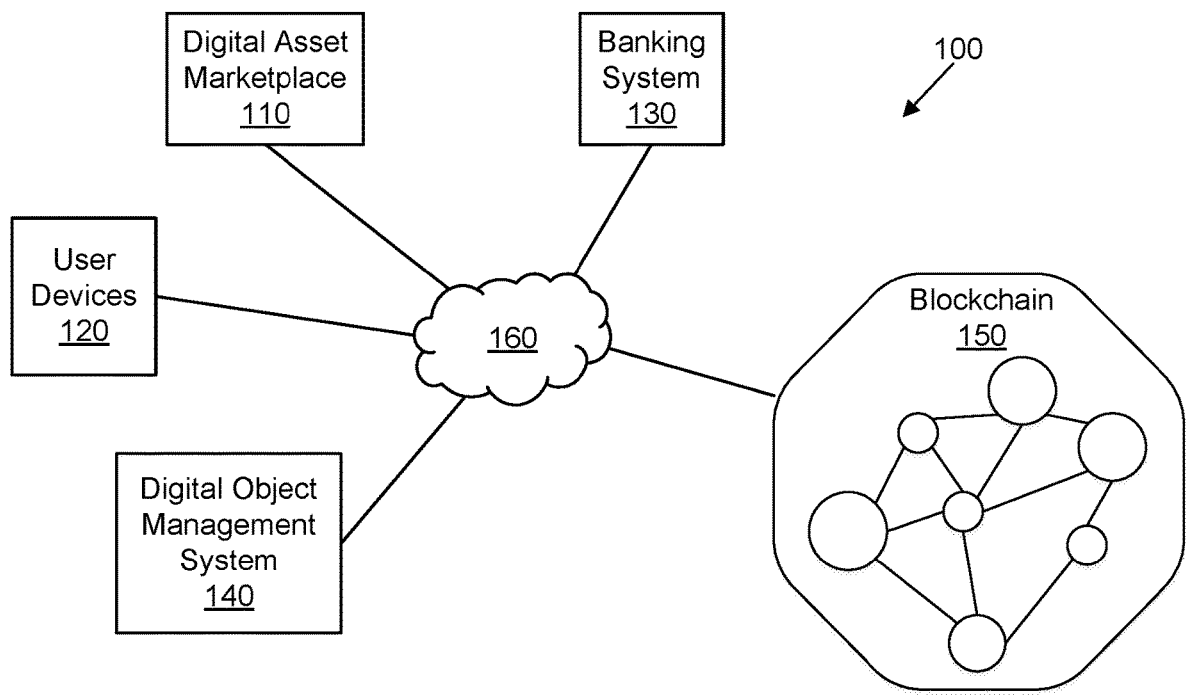
FIG. 1 is a high-level block diagram illustrating an environment in which digital assets are managed, according to some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A person who possesses a non-fungible token (NFT) is typically considered to be the owner of a digital content item referenced by the NFT. For example, if a person can demonstrate that a token is stored in a wallet owned by the person, the person can conduct transactions associated with the digital content item such as selling the digital content item to another person, using the token as collateral for a loan, or granting usage rights for the content item in exchange for compensation. However, if a wallet is compromised or a token is stolen, there are few existing safeguards for the token's actual owner to demonstrate his or her ownership of the token. To solve this problem, the inventors have conceived of and reduced to practice an ownership verification tool for digital objects, which for example can be used in a digital asset marketplace for buying and selling digital objects.

In some implementations, a system receives a request to transfer ownership of a digital object from a first user to a second user. The digital object is associated with a smart contract that stores a first hash value to represent a user device used to acquire ownership of the digital object, such as a user device used to create the digital object or a user device used to purchase the digital object. When the request to transfer ownership is received, the system accesses a user account of the first user to retrieve information identifying a user device associated with the user account of the first user. The first hash value is authenticated based on the information representing the first user's device. If the first hash value is determined to match the user device information stored in the first user's account, the system transfers a token representing the digital object to a wallet associated with the second user. The system also updates the smart contract to include a second hash value that represents a user device used by the second user to request the ownership transfer of the digital object.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

FIG. 1 is a high-level block diagram illustrating an environment 100 in which digital assets are managed. As shown in FIG. 1, the environment 100 can include a digital asset marketplace 110, user devices 120, a banking system 130, a digital object management system 140, and a blockchain 150 in communication over a network 160. In some implementations, at least some of the entities in the environment 100 are associated with a common enterprise. For example, one or more of the digital asset marketplace 110, banking system 130, or digital object management system 140 can be operated by an enterprise, such as a telecommunications service provider that also operates a telecommunications network over which the user devices 120 are registered to communicate. The enterprise can also maintain at least some portions of the blockchain 150, in some implementations. Any of a variety of other types of enterprises can operate components of the environment 100.

The digital asset marketplace 110 is a platform for managing sale of digital objects. Users of the digital asset marketplace 110 list digital objects for sale via the marketplace or browse the marketplace to purchase digital objects listed for sale by other users.

User devices 120 access the digital asset marketplace 110, for example via one or more websites, in order to browse digital objects for purchase or list digital objects for sale. The user devices 120 can include any of a variety of computing devices capable of communicating over the network 160, such as a mobile telephone, a tablet computer, a personal computer (PC), a game console, a music player, a wearable electronic device, or a network-connected ("smart") device (e.g., a television or home assistant device). The user devices 120 each include one or more device identifiers, such as a mobile station international subscriber directory number (MSISDN), an international mobile subscriber identity (IMSI), an international mobile equipment identity (IMEI), a media access control (MAC) address, a unique device identifier (UDID), or a device serial number. In some implementations, the digital asset marketplace is maintained by a telecommunications service provider and the user devices 120 are mobile devices registered to operate on a telecommunications network provided by the service provider.

The user devices 120 additionally store digital content in at least some implementations. For example, user devices 120 can store content items such as pictures, music, or videos that are used to generate corresponding digital objects for sale through the marketplace 110.

The digital asset marketplace 110 integrates with a banking system 130 to process financial transactions associated with the sale or purchase of digital objects via the digital asset marketplace 110. The banking system 130 can maintain financial accounts, such as checking, savings, investment, or credit accounts, that are based in fiat currency, cryptocurrency, or both. Additionally, the banking system 130 can enable conversion between types of currency (e.g., exchanging one type of fiat currency for another, exchanging one type of cryptocurrency for another, exchanging fiat currency for cryptocurrency, or exchanging cryptocurrency for fiat currency). The banking system 130 can further enable users to directly use digital objects as a payment mechanism, as collateral for a loan, exchanging usage rights, etc. In some implementations, the banking system 130 is a money platform hosted by the same enterprise as the digital asset marketplace 110 and/or the digital object management system 140. However, the digital asset marketplace 110 can integrate with external banking systems instead of or in addition to an enterprise-specific banking system.

The digital object management system 140 facilitates generation of new digital objects as well as validates ownership of digital objects. A digital object is a data item that uniquely represents a digital content item, such as an image, a video, or an audio file. Digital objects are each represented by a corresponding digital object token, which is a cryptographic token such as a non-fungible cryptographic token (NFT). The token points to a location where the corresponding digital content item is stored, for example via a uniform resource indicator (URI) or interplanetary file system (IPFS) address. To generate digital object tokens and transfer ownership, the digital object management system 140 generates smart contract that are directly or indirectly (e.g., via the token) recorded to a blockchain 150.

A blockchain network includes a plurality of nodes (e.g., servers) that each maintain respective copies of a blockchain, such as the blockchain 150. In actual practice, blockchain network may include hundreds or thousands of nodes operating as a distributed peer-to-peer network. Nodes of the network implement known consensus algorithms to validate transactions submitted to the blockchain network. A verified transaction may include transferred cryptocurrency, contracts, records, or other information to be recorded to the blockchain. In some embodiments, multiple transactions are combined together into a block of data that is verified across the nodes of the blockchain network. Once verified, this block of data can be added to an existing blockchain maintained by each of the nodes.

In some implementations, the blockchain 150 is a private blockchain maintained by the enterprise associated with the digital asset marketplace 110 and/or the digital object management system 140. However, in other implementations, the digital object management system 140 uses any of a variety of public blockchains, such as the Ethereum blockchain, or private blockchains maintained by entities other than the enterprise with which the digital object management system 140 is associated.

When a person acquires ownership of a digital object represented by a token, a private key to unlock the token is stored in a blockchain wallet controlled by the person. Public and private keys are an integral component of cryptocurrencies built on blockchain networks and are part of a larger field of cryptography known as public-key cryptography (PKC) or asymmetric encryption. The goal of PKC is to easily transition from a first state (e.g., a private key) to a second state (e.g., a public key) while reversing the transition from the second state to the first state nearly impossible, and in the process, proving possession of a secret key without exposing that secret key. The product is subsequently a one-way mathematical function, which makes it ideal for validating the authenticity of transactions such as cryptocurrency transactions because possession of the first state such as the secret key cannot be forged. PKC relies on a two-key model, the public and private key.

The general purpose of PKC is to enable secure, private communication using digital signatures in a public channel that is susceptible to potentially malicious eavesdroppers. In the context of cryptographic tokens, the goal is to prove that a traded token was indeed signed by the owner of that token, and was not forged, all occurring over a public blockchain network between peers. A private key of a blockchain wallet unlocks the right for the blockchain wallet's owner to spend transfer tokens in the blockchain wallet and therefore must remain private. A wallet address of the blockchain wallet is cryptographically linked to the blockchain wallet's private key and is publicly available to all users to enable other users to send NFTs to the user's blockchain wallet. For example, the wallet address may be a public key generated from the blockchain wallet's private key using one or more PKC algorithms. Public keys are generally used to identify wallets, whereas the private keys are used to authorize actions of the respective wallet.

Wallet addresses for blockchain wallets are typically represented in human-legible form in one of three ways: as a hexadecimal representation, as a Base64 representation, or as a Base58 representation. In each of these common ways of representing the wallet addresses, each wallet address is represented using a string of letters and numbers, typically exceeding 20 characters in length. The length and randomness of the alphanumeric string makes the wallet address unwieldy and difficult to remember, thereby decreasing its usability and hindering the adoption of cryptocurrencies.

Structurally, in some embodiments, customized, flexible cryptographic tokens connected to a smart contract are powered by a less flexible, base cryptocurrency. Miners operating on the network for the base cryptocurrency power execution of a distributed application (dApp) or smart contract. The smart contract is held by an administrative user and includes all of the custom cryptographic tokens. The custom cryptographic tokens do not "move" in the same sense that the base cryptocurrency moves via transactions. The smart contract is "held" by the administrative user though secondary users may interact with the smart contract and various portions (specific tokens) may be attributed to those secondary users.

In addition to transactions being signed by the wallet holding a token, the digital object management system 140 according to implementations herein authenticates ownership of digital objects based on information about a user device used to acquire ownership of the object. When a user first creates a token to represent a digital object, the digital object management system 140 captures one or more identifiers of the user device used by the user to create the token. Similarly, when a user purchases a token from another user, the system 140 captures one or more identifiers of device used to request or complete the purchase transaction. A hash value is computed based on the captured device identifier(s) and added to a set of metadata associated with the token. The hash value can then be compared against user device data identified in user accounts maintained by the digital object management system 140 to ensure that a purported owner of the token is the token's actual owner. Thus, if a wallet is compromised and a malicious actor attempts to sell another user's digital objects, the malicious actor will not be authenticated as the owner of the digital object and will not be permitted to sell the object.

Digital Asset Marketplace

Figure 2:
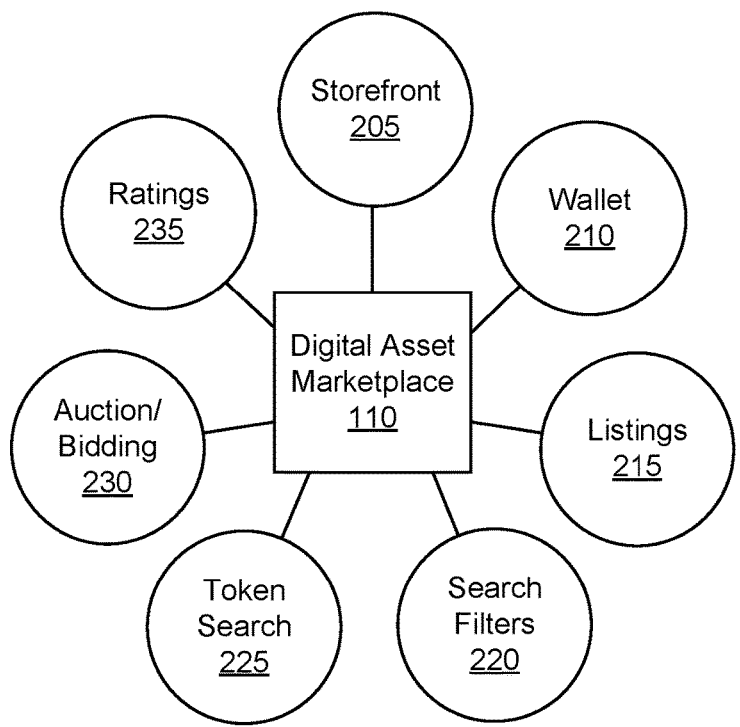
FIG. 2 illustrates features of a digital asset marketplace, according to some implementations.

FIG. 2 illustrates features of a digital asset marketplace 110, according to some implementations.

A storefront 205 enables buying and selling of digital assets. The storefront 205 includes visual content that is accessible over the network 160, such as web pages or mobile application content. The storefront 205 can enable owners of digital assets to list the assets for sale through the marketplace 110. For example, the storefront 205 provides user interfaces that enable an owner to input information about an existing digital object the owners would like to list for sale. Additionally or alternatively, the storefront 205 can integrate into the digital object management system 140 to enable a digital content creator to mint a token for a new digital object as part of a process for listing the digital object for sale through the marketplace. Similarly, the storefront 205 includes user interfaces to enable users to browse digital objects and place bids to purchase the digital objects. The user interfaces for browsing digital objects can include an input box to receive user search queries, links to browse digital objects by features such as category or author, or controls to apply filters to the set of digital objects currently listed for sale via the marketplace.

A wallet component 210 maintains wallets for users to store tokens associated with digital assets owned by the users. A private wallet can be maintained for each user of the digital asset marketplace 110. In some implementations, the wallets are maintained by the banking system 130 shown in FIG. 1. When a user creates an account with the digital asset marketplace 110, the wallet component 210 creates a new wallet for the user or allows the user to link an existing wallet to the user's account. A wallet is typically identified by a wallet address in a human-legible textual representation. For example, the wallet address may be a string of numbers and/or characters such as in a hex format, a Base64 format, or a Base58 format.

Listings component 215 generates product listings for publication via the storefront 205, providing a mechanism for an owner of a digital object to offer the object for sale on the marketplace 110. The listings can be generated, for example, using a template that creates a webpage to display information about a digital object and a starting bid price for the object. Each listing can be associated with a user account of the current owner of the associated digital object. The listings can also include metadata related to the associated objects or current owner of the objects, such as metadata identifying the type of object (e.g., pictures, videos, or music), a genre of the object, whether the object is associated with a series, the original creator of the object, the number of unique owners of the object, the amount of time the current owner has owned the object, the number of other objects owned by the current owner, or the number of other objects sold by the current owner.

Search filters 220 enable users to browse digital objects according to their features or characteristics. For example, the digital asset marketplace 110 determines features or characteristics of the object listings generated by the listings component 215 such as most popular, newest added, or ongoing offer, enabling a user to apply search filters to browse corresponding digital objects. Other types of search filters 220 that may be enabled in the marketplace include filters for types of objects, genre of objects, objects added within specified date ranges, objects with specified starting bids, objects associated with a series, or objects created by a specified author.

Token search 225 processes search queries to enable users to search for particular digital objects. Search queries can be used independently of or together with the search filters 220 to browse digital objects available for purchase through the marketplace.

Auction/Bidding 230 manages an auction for digital objects. When a digital object is listed for sale via the marketplace, the creator or owner may specify a starting bid price for the object or accept a minimum starting bid price set by the marketplace. The auction/bidding component 230 processes user bids received for the digital object to determine the price at which the object is sold. For example, after a digital object is listed for sale, the auction/bidding component 230 may start an auction timer that, when expired, causes the auction to end. The highest bid price at the expiration of the auction timer can be the price for which the digital object is sold. In another example, the auction/bidding component 230 collects bids for a digital object until a bid is received that is satisfactory to the digital object's creator or current owner.

Ratings component 235 collects ratings received from users of the digital asset marketplace 110 for the objects listed for sale via the marketplace. A rating received for a particular digital object can attach to the user who sold the particular object, to the original creator of the particular object, to a series of digital objects to which the particular object belongs, or to other entities or objects associated with the particular object. When an object has previously been sold through the marketplace 110, the previous ratings associated with the object can also be used as ratings for the object itself. As users browse the digital objects available through the marketplace 110, the ratings component 235 can add to each digital object listing a rating for the object itself, the owner, the original creator, the object series, and/or other entities.

Wireless Communications System

Figure 3:
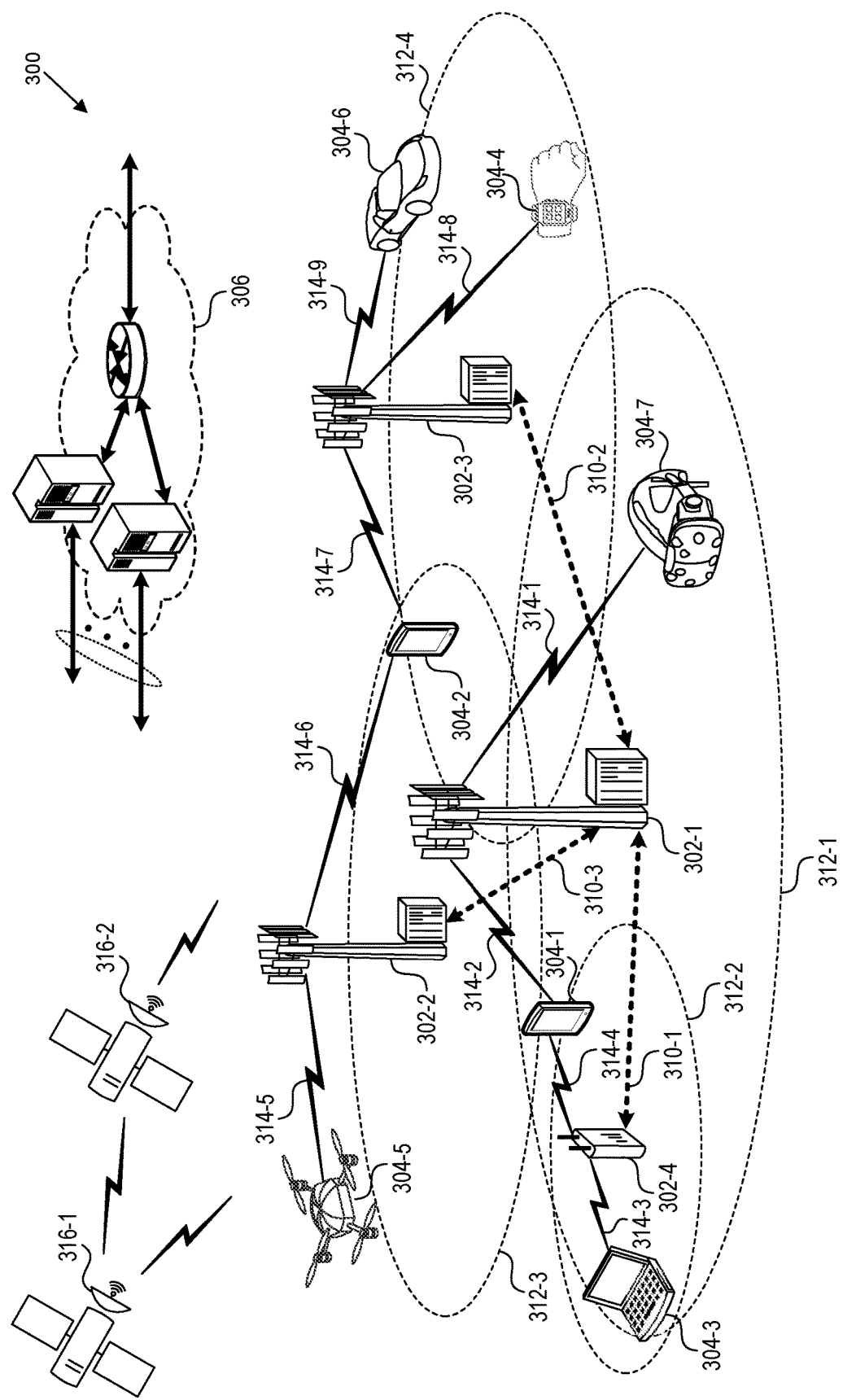
FIG. 3 is a block diagram that illustrates a wireless communications system that can implement aspects of the present technology.

FIG. 3 is a block diagram that illustrates a wireless telecommunication network 300 ("network 300") in which aspects of the disclosed technology are incorporated. The network 300 includes base stations 302-1 through 302-4 (also referred to individually as "base station 302" or collectively as "base stations 302"). A base station is a type of network access node (NAN) that can also be referred to as a cell site, a base transceiver station, or a radio base station. The network 300 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 300 formed by the network 300 also include wireless devices 304-1 through 304-7 (referred to individually as "wireless device 304" or collectively as "wireless devices 304") and a core network 306. The wireless devices 304-1 through 304-7 can correspond to or include network 300 entities capable of communication using various connectivity standards. For example, a 5G communication channel can use millimeter wave (mmW) access frequencies of 28 GHz or more. In some implementations, the wireless device 304 can operatively couple to a base station 302 over a long-term evolution/long-term evolution-advanced (LTE/LTE-A) communication channel, which is referred to as a 4G communication channel.

The core network 306 provides, manages, and controls security services, user authentication, access authorization, tracking, Internet Protocol (IP) connectivity, and other access, routing, or mobility functions. The base stations 302 interface with the core network 306 through a first set of backhaul links (e.g., S1 interfaces) and can perform radio configuration and scheduling for communication with the wireless devices 304 or can operate under the control of a base station controller (not shown). In some examples, the base stations 302 can communicate with each other, either directly or indirectly (e.g., through the core network 306), over a second set of backhaul links 310-1 through 310-3 (e.g., X1 interfaces), which can be wired or wireless communication links.

The base stations 302 can wirelessly communicate with the wireless devices 304 via one or more base station antennas. The cell sites can provide communication coverage for geographic coverage areas 312-1 through 312-4 (also referred to individually as "coverage area 312" or collectively as "coverage areas 312"). The geographic coverage area 312 for a base station 302 can be divided into sectors making up only a portion of the coverage area (not shown). The network 300 can include base stations of different types (e.g., macro and/or small cell base stations). In some implementations, there can be overlapping geographic coverage areas 312 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 300 can include a 5G network 300 and/or an LTE/LTE-A or other network. In an LTE/LTE-A network, the term eNB is used to describe the base stations 302, and in 5G new radio (NR) networks, the term gNBs is used to describe the base stations 302 that can include mmW communications. The network 300 can thus form a heterogeneous network 300 in which different types of base stations provide coverage for various geographic regions. For example, each base station 302 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 300 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 300 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 300 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 304 and the base stations 302 or core network 306 supporting radio bearers for the user plane data. At the Physical (PHY) layer, the transport channels are mapped to physical channels.

Wireless devices can be integrated with or embedded in other devices. As illustrated, the wireless devices 304 are distributed throughout the system 300, where each wireless device 304 can be stationary or mobile. For example, wireless devices can include handheld mobile devices 304-1 and 304-2 (e.g., smartphones, portable hotspots, tablets, etc.); laptops 304-3; wearables 304-4; drones 304-5; vehicles with wireless connectivity 304-6; head-mounted displays with wireless augmented reality/virtual reality (AR/VR) connectivity 304-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 304-1, 304-2, 304-3, 304-4, 304-5, 304-6, and 304-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 300 equipment at the edge of a network 300 including macro eNBs/gNBs, small cell eNBs/gNBs, relay base stations, and the like. A wireless device can also communicate with other wireless devices either within or outside the same coverage area of a base station via device-to-device (D2D) communications.

The communication links 314-1 through 314-9 (also referred to individually as "communication link 314" or collectively as "communication links 314") shown in network 300 include uplink (UL) transmissions from a wireless device 304 to a base station 302, and/or downlink (DL) transmissions from a base station 302 to a wireless device 304. The downlink transmissions can also be called forward link transmissions while the uplink transmissions can also be called reverse link transmissions. Each communication link 314 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 314 can transmit bidirectional communications using frequency division duplex (FDD) (e.g., using paired spectrum resources) or Time division duplex (TDD) operation (e.g., using unpaired spectrum resources). In some implementations, the communication links 314 include LTE and/or mmW communication links.

In some implementations of the network 300, the base stations 302 and/or the wireless devices 304 include multiple antennas for employing antenna diversity schemes to improve communication quality and reliability between base stations 302 and wireless devices 304. Additionally or alternatively, the base stations 302 and/or the wireless devices 304 can employ multiple-input, multiple-output (MIMO) techniques that can take advantage of multi-path environments to transmit multiple spatial layers carrying the same or different coded data.

In some examples, the network 300 implements 6G technologies including increased densification or diversification of network nodes. The network 300 can enable terrestrial and non-terrestrial transmissions. In this context, a Non-Terrestrial Network (NTN) is enabled by one or more satellites such as satellites 316-1 and 316-2 to deliver services anywhere and anytime and provide coverage in areas that are unreachable by any conventional Terrestrial Network (TN). A 6G implementation of the network 300 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 300 can implement a converged Radio Access Network (RAN) and Core architecture to achieve Control and User Plane Separation (CUPS) and achieve extremely low User Plane latency. In yet another example of 6G, the network 300 can implement a converged Wi-Fi and Core architecture to increase and improve indoor coverage.

5G Core Network Functions

Figure 4:
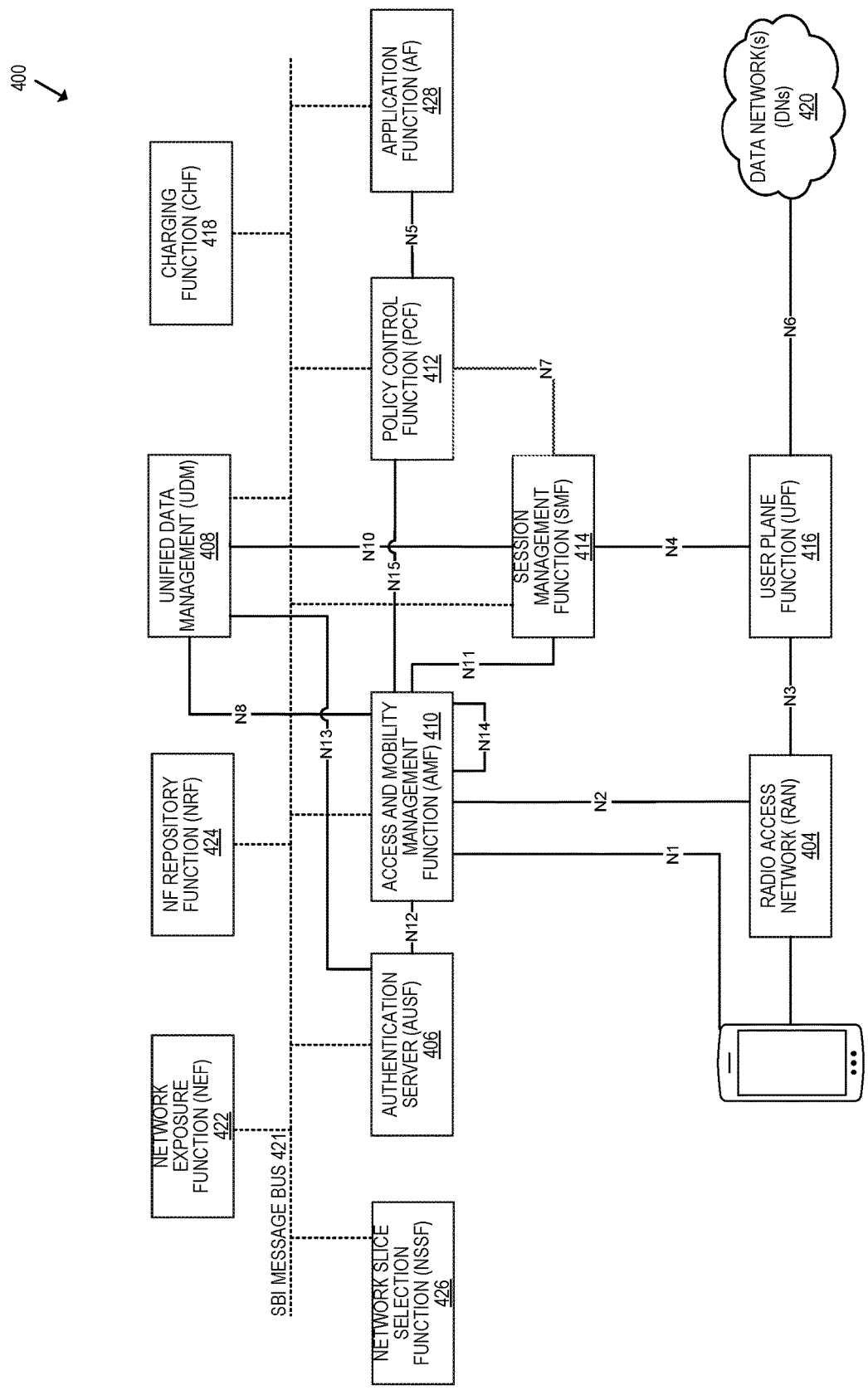
FIG. 4 is a block diagram that illustrates 5G core network functions (NFs) that can implement aspects of the present technology.

FIG. 4 is a block diagram that illustrates an architecture 400 including 5G core network functions (NFs) that can implement aspects of the present technology. A wireless device 402 can access the 5G network through a NAN (e.g., gNB) of a RAN 404. The NFs include an Authentication Server Function (AUSF) 406, a Unified Data Management (UDM) 408, an Access and Mobility management Function (AMF) 410, a Policy Control Function (PCF) 412, a Session Management Function (SMF) 414, a User Plane Function (UPF) 416, and a Charging Function (CHF) 418.

The interfaces N1 through N15 define communications and/or protocols between each NF as described in relevant standards. The UPF 416 is part of the user plane and the AMF 410, SMF 414, PCF 412, AUSF 406, and UDM 408 are part of the control plane. One or more UPFs can connect with one or more data networks (DNs) 420. The UPF 416 can be deployed separately from control plane functions. The NFs of the control plane are modularized such that they can be scaled independently. As shown, each NF service exposes its functionality in a Service Based Architecture (SBA) through a Service Based Interface (SBI) 421 that uses HTTP/2. The SBA can include a Network Exposure Function (NEF) 422, a NF Repository Function (NRF) 424 a Network Slice Selection Function (NSSF) 426, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 424, which maintains a record of available NF instances and supported services. The NRF 424 allows other NF instances to subscribe and be notified of registrations from NF instances of a given type. The NRF 424 supports service discovery by receipt of discovery requests from NF instances and, in response, details which NF instances support specific services.

The NSSF 426 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 402 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 408 and then requests an appropriate network slice of the NSSF 426.

The UDM 408 introduces a User Data Convergence (UDC) that separates a User Data Repository (UDR) for storing and managing subscriber information. As such, the UDM 408 can employ the UDC under 3GPP TS 42.101 to support a layered architecture that separates user data from application logic. The UDM 408 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 408 can contain voluminous amounts of data that is accessed for authentication. Thus, the UDM 408 is analogous to a Home Subscriber Server (HSS), to provide authentication credentials while being employed by the AMF 410 and SMF 414 to retrieve subscriber data and context.

The PCF 412 can connect with one or more application functions (AFs) 428. The PCF 412 supports a unified policy framework within the 5G infrastructure for governing network behavior. The PCF 412 accesses the subscription information required to make policy decisions from the UDM 408, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 424. This allows the SCP to become the delegated discovery point in a datacenter, offloading the NRF 424 from distributed service meshes that make-up a network operator's infrastructure. Together with the NRF 424, the SCP forms the hierarchical 5G service mesh.

The AMF 410 receives requests and handles connection and mobility management while forwarding session management requirements over the N11 interface to the SMF 414. The AMF 410 determines that the SMF 414 is best suited to handle the connection request by querying the NRF 424. That interface and the N11 interface between the AMF 410 and the SMF 414 assigned by the NRF 424, use the SBI 421. During session establishment or modification, the SMF 414 also interacts with the PCF 412 over the N7 interface and the subscriber profile information stored within the UDM 408. Employing the SBI 421, the PCF 412 provides the foundation of the policy framework which, along with the more typical QoS and charging rules, includes Network Slice selection, which is regulated by the NSSF 426.

Wireless Communication System for Digital Object Generation

Figure 5:
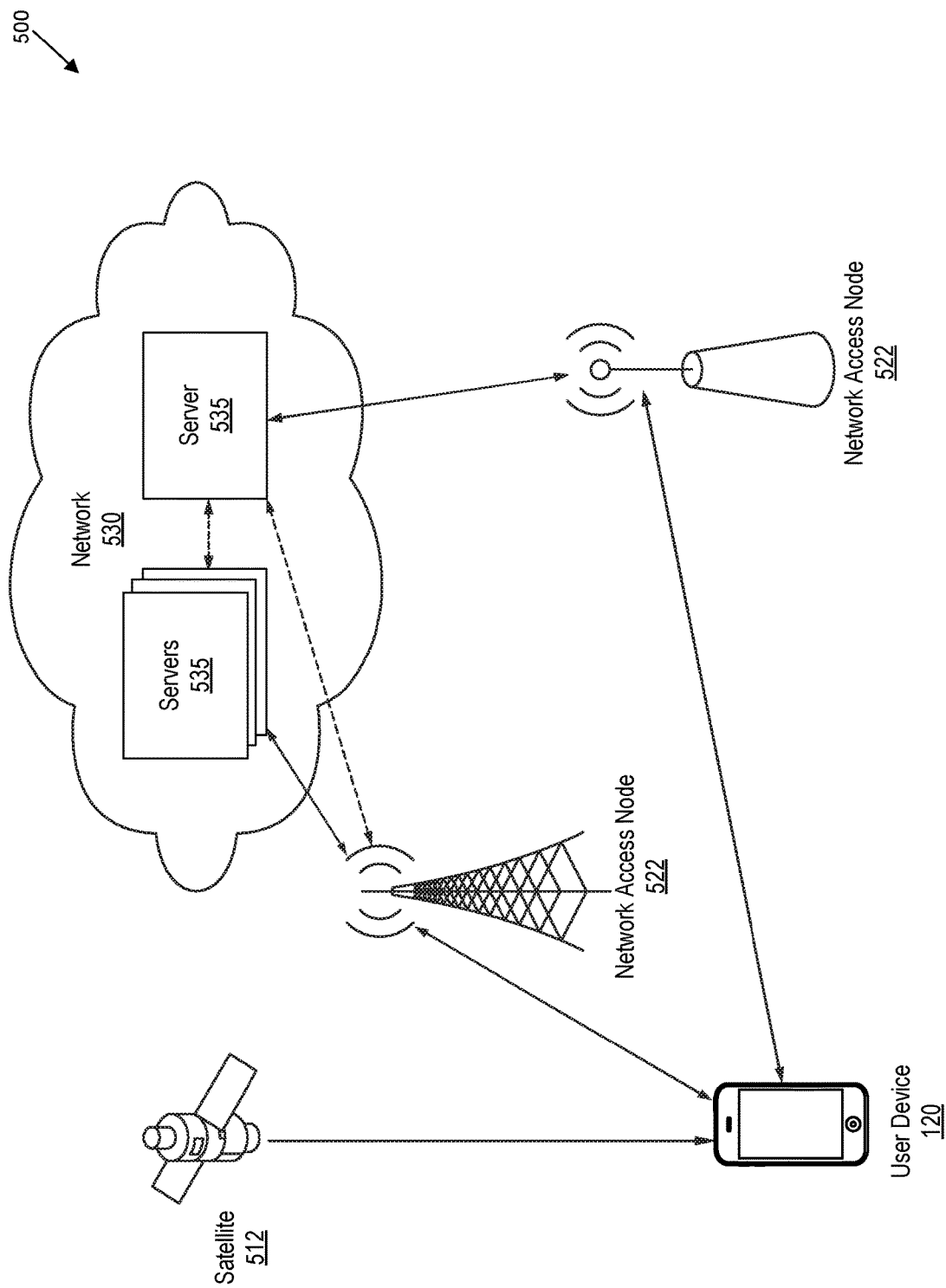
FIG. 5 illustrates an example system environment in which digital object generation occurs, according to some implementations.

FIG. 5 illustrates an example system environment 500 in which tokens for digital objects are generated. The environment 500 includes network access nodes (NANs) 522 that enable a user device 120 to communicate over a network 530. The NANs 522 may be operated by a telecommunications service provider to which the user device 120 is registered, enabling the user device to attach to the NANs 522 in order to send data to and receive data from the network 530. In addition to other network communications facilitated through the NANs 522, the user device 120 can send data to and receive data from one or more remote servers 535 that implement at least a portion of the functionality of components of the digital asset management environment 100 (such as the digital asset marketplace 110 or the digital object management system 140).

A user device in communication with a NAN transmits data that is used by the NAN or other network components to connect the device to the network 530, to validate the user device, to enable data to be sent back to the user device, or for any of a variety of other purposes within the telecommunications network. When a user device 120 is used to perform an action on the telecommunications network, including generating a digital object token, data associated with the user device 120 itself (such as a device identifier or a signal strength of a signal received from a NAN) as well as data associated with the network node(s) with which the user device communicates (such as a NAN identifier or a signal strength of a signal received from the user device) can be captured by the network nodes to uniquely identify the user device or the resulting digital object that is generated. The servers 535 receive at least a portion of the device identification or node identification data captured as the user device 120 performs the action.

The servers 535 can also receive other types of data associated with a user device's connection to the telecommunications network. For example, the servers 535 can determine a location of the user device 120 based on, for example, a GPS signal received from a satellite 512 or triangulation from multiple NANs 522. The servers 535 can receive a time stamp indicating a time the user device 120 performed an action (such as generating a digital object token), where the time stamp can be generated by the user device 120, a NAN, or the servers 535. The user device 120 can also transmit data indicating a status of the device at the time an action is performed, such as battery level or available memory.

Digital Object Management System

Figure 6:
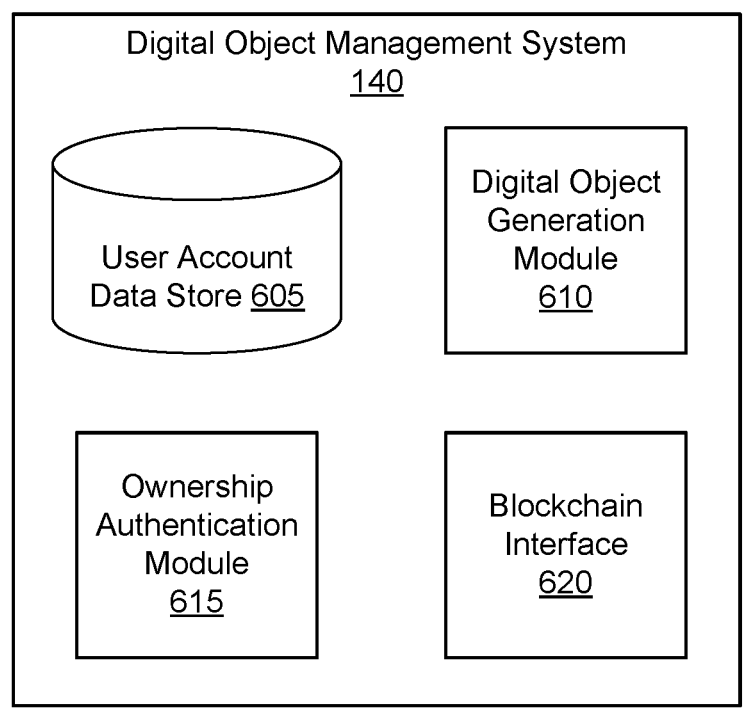
FIG. 6 is a block diagram illustrating functional modules executed by a digital object management system, according to some implementations.

FIG. 6 is a block diagram illustrating functional modules executed by the digital object management system 140, according to some implementations. As shown in FIG. 6, the digital object management system 140 maintains a user account data store 605 and executes a digital object generation module 610, an ownership authentication module 615, and a blockchain interface 620. The digital object management system 140 can include additional, fewer, or different modules, and functionality described herein can be divided differently between the modules. As used herein, the term "module" refers broadly to software components, firmware components, and/or hardware components. Accordingly, the modules 610, 615, 620 could each be comprised of software, firmware, and/or hardware components implemented in, or accessible to, the digital object management system 140.

The user account data store 605 maintains a user account for each of a plurality of users of an enterprise. For each user, the user account data store 605 includes information identifying the user and/or any devices used by the user. For example, when the digital object management system 140 is operated by a telecommunications service provider, the provider maintains a profile of its customers that indicates any mobile devices that are registered to operate on the provider's network. The profile can also include data such as the user's name, an alias for the user (e.g., a username used in the digital asset marketplace 110), or a home address for the user. The user account for a telecom customer can be linked to a user account used by the customer to buy or sell digital objects on the digital asset marketplace 110, and in some implementations can be the same user account. For example, when a user requests to purchase a digital object via the digital asset marketplace 110, the user logs into an account with the digital asset marketplace 110 using a user identifier. The user identifier that enables login to the digital asset marketplace 110 is either the same user identifier for the user account maintained by the telecommunications system, or is mapped to a user identifier for the telecom user account in a database maintained by the telecommunications system. Furthermore, in some implementations, the user account data store 605 maintains a cryptographic wallet address for at least some of the user accounts to facilitate generation and trade of digital object tokens. Accordingly, a customer's telecom account can be used to enable users to buy and sell digital objects, validate the customer's ownership of digital objects, Although FIG. 6 depicts the user account data store 605 as being a data store maintained by the digital object management system 140, user account data can be maintained in other implementations by the digital asset marketplace 110, the banking system 130, an enterprise operating the marketplace 110 and/or system 140, an external system, or a combination thereof.

The digital object generation module 610 generates smart contracts or tokens to represent digital objects. When a smart contract is generated, the digital object generation module 610 captures data associated with the user device used to initiate the token creation. The digital object generation module 610 computes a hash value to represent the user device data and attaches the hash value to the token, for example by writing the hash value into the smart contract. A process for generating digital object tokens is described with respect to FIG. 7.

The ownership authentication module 615 validates ownership of digital object tokens. For example, when a first user purports to be the current owner of a digital object and offers to sell the digital object to a second user, the ownership authentication module 615 authenticates that the first user is indeed the object's current owner and able to sell the object to the second user. A process for authenticating ownership is described with respect to FIG. 8.

The blockchain interface 620 enables the other components of the digital object management system 140 to access data stored on or write new data to the blockchain 150. For example, the blockchain interface 620 calls one or more application programming interfaces (APIs) configured to write data to or read data from the blockchain. In some cases, the blockchain is maintained by the enterprise that operates the digital object management system 140. By operating the blockchain internally, the digital object management system 140 can use the blockchain interface 620 to update user account information stored on the blockchain. For example, when a user replaces an older user device with a new user device, any objects owned by the user will be linked to the old user device (e.g., based on a hash value stored in the objects' smart contracts). The blockchain interface 620 can update the stored smart contracts to include an identifier of the new user device to ensure that the user can be properly validated as the owner of the digital objects. Alternatively, information about the old user device and new user device can be linked in the user's account such that validation can occur without modifying data stored on the blockchain.

Generating Digital Object Tokens

Figure 7:
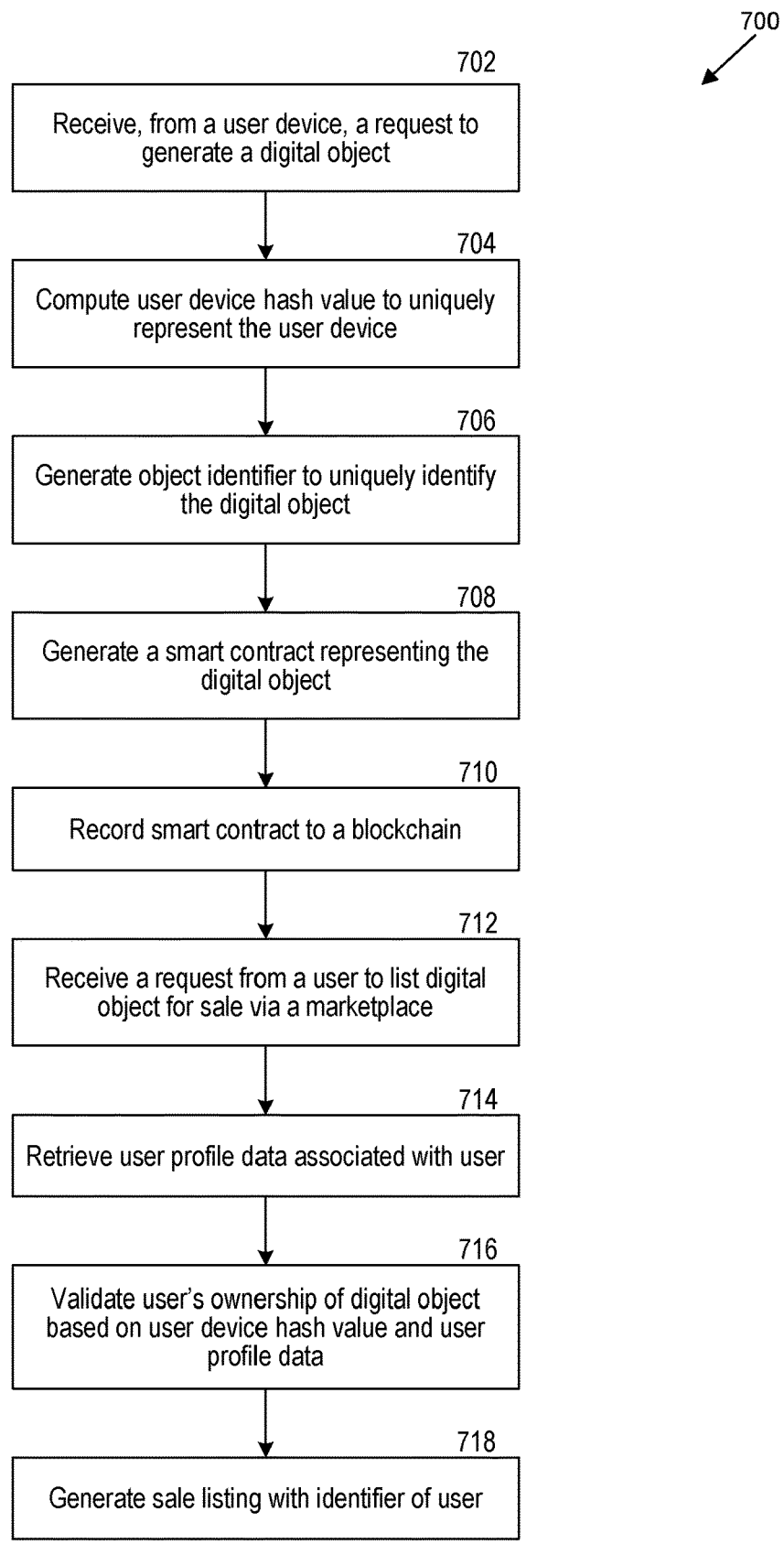
FIG. 7 is a flowchart illustrating a process for generating digital object tokens, according to some implementations.

FIG. 7 is a flowchart illustrating a process 700 for generating digital object tokens, according to some implementations. The process 700 can be performed by the digital object management system 140 operating within the ecosystem of an enterprise that maintains user account data. Other implementations of the process 700 include additional, fewer, or different steps, or perform the steps in different orders.

At block 702, the digital object management system 140 receives a request to generate a digital object token. The request is received from a user device, which includes one or more identifiers to uniquely identify the user device. For example, a mobile device configured to operate on a telecommunications network includes a MSISDN, IMSI, IMEI, or a device serial number. The request to generate a token can point to a digital content item stored at a network location (e.g., via a URI or IPFS address associated with the network location), or digital content can be uploaded as part of the request.

At block 704, the digital object management system 140 computes a user device hash value to uniquely represent the user device from which the token generation request was received. The user device hash value can be computed based on any identifiers or combination of identifiers of the user device.

At block 706, the digital object management system 140 generates an object identifier to uniquely represent the digital object. The object identifier can include a next value in a sequence of object identifier values, a random string computed at the time the object generation request is received, a hash value computed based on the object generation request, or a combination thereof. For example, a hash value can be computed based on one or more features associated with the object generation request such as signal strength measured by the user device at the time of the object generation request, current IP address of the user device, an identifier of the user device, GPS coordinate location of the user device, identifier of a NAN in communication with the user device, battery level of the user device at the time of the object generation request, available memory on the user device, or a representation of applications or content stored on the user device at the time of the object generation request.

At block 708, the digital object management system 140 generates a smart contract to represent the digital object. The smart contract can include one or more identifiers of the digital object or the creator of the digital object, which can be used to validate the object or its ownership. For example, when generating the smart contract, the digital object management system 140 encodes the user device hash value and/or the object identifier into the smart contract.

At block 710, the digital object management system 140 records the smart contract to a blockchain.

Once the smart contract has been recorded, the digital object represented by the smart contract can be listed for sale via the digital asset marketplace 110. At block 712, the digital object management system 140 receives a request from a user to list the digital object for sale. In some circumstances, the request to list the digital object can be incorporated into the request to generate the digital object received at block 702, for example because a creator of digital content may desire to generate a non-fungible token for the creator's content in order to sell the content on the marketplace 110. In other circumstances, the steps of generating a digital object and listing it for sale may occur independently, at separate times.

At block 714, the digital object management system 140 retrieves user profile data associated with the user who is listing the object for sale via the marketplace 110. For example, the user can log into an account with the marketplace, enabling the system 140 to query the user's user profile data based on the user's login credentials. In an example implementation where the marketplace 110 is associated with a telecommunications service provider, the system 140 can alternatively query the user's user profile based on an identifier of the user device used to submit the request to list the digital object for sale.

At block 716, the digital object management system 140 validates the user's ownership of the digital object based on the user profile data and the user device hash that is stored in the digital object's associated smart contract. As described above, the user device hash represents the user device used to create the digital object. To validate ownership of the digital object, the digital object management system 140 queries the user profile for information about any user devices registered to the user profile, retrieving identifier(s) of the user devices and generating a hash value to represent the retrieved identifiers using the same hashing function as was used to generate the user device hash associated with the digital object. Alternatively, the user profile stores applicable hash values, which are returned in response to the query from the digital object management system 140 instead of the user device identifiers themselves. If the hash value retrieved from or generated based on the user devices registered to the user account match the user device hash value recorded in the smart contract, the digital object management system 140 determines the user associated with the user profile is the true owner of the digital object.

At block 718, the digital object management system 140 causes the marketplace 110 to generate a sale listing for the digital object, which can be published to the marketplace to make the digital object available for purchase by other users.

In some implementations, the digital object is not listed for sale in the marketplace 110 unless the ownership of the digital object is validated, as described with respect to block 716. In other implementations, the digital object management system 140 validates ownership at the time that another user requests to purchase the digital object, instead of or in addition to validating ownership prior to the sale listing being generated.

Authenticating Ownership of Digital Objects

Figure 8:
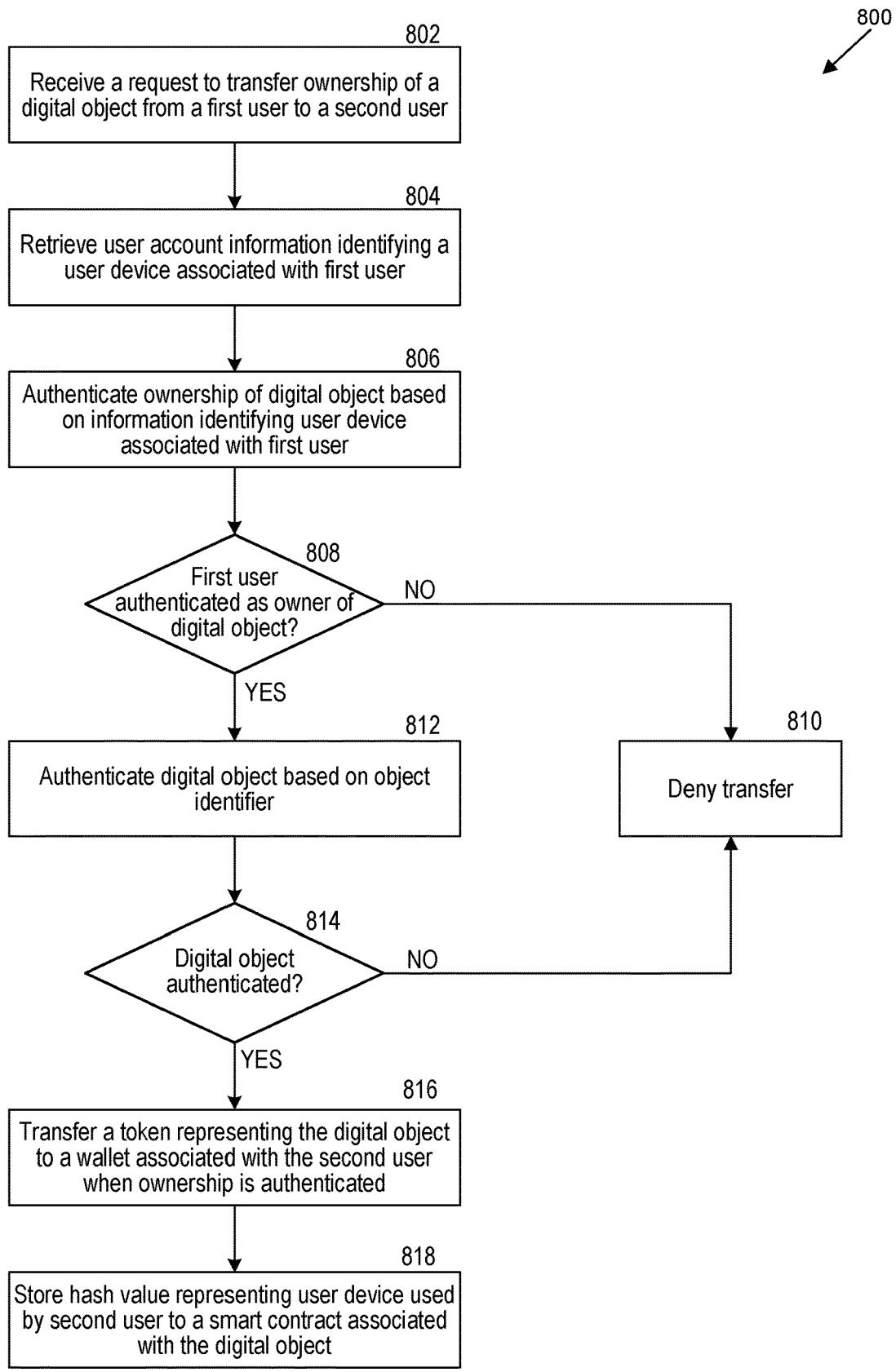
FIG. 8 is a flowchart illustrating a process for authenticating transfers of ownership of digital objects, according to some implementations.

FIG. 8 is a flowchart illustrating a process 800 for authenticating transfers of ownership of digital objects, according to some implementations. Like the process 700, the process 800 can be performed by the digital object management system 140 in an enterprise ecosystem with user account data that is usable to authenticate digital objects or ownership of digital objects.

At block 802, the digital object management system 140 receives a request to transfer ownership of a digital object from a first user to a second user. For example, the digital object management system 140 processes a request to purchase the digital object received from the second user via the marketplace 110. As described above, the digital object is associated with a smart contract that records one or more identifiers used to identify the owner of the object and/or the object itself. In particular, the smart contract retains a hash value representing a user device that was used by a current owner of the digital object to acquire the digital object (e.g., a user device used to generate the digital object or a user device used to purchase the digital object). The smart contract can further store an object identifier to uniquely identify the digital object. Such object identifiers can be generated by applying a hash function to features retrieved or derived from the circumstances in which the object was generated, in some implementations.

As further described above, users of the marketplace 110 have associated user accounts maintained by the marketplace or by an enterprise operating the marketplace, such as a telecommunications service provider. At block 804, the digital object management system 140 accesses a user account associated with the first user to retrieve information identifying a user device registered to the user account of the first user. For example, when the first user lists the digital object for sale via the marketplace 110, the sale listing can be linked to the first user's user account, such that the digital object management system 140 can query a user account data store for the first user's information based on the sale listing.

At block 806, the digital object management system 140 authenticates the first user's ownership of the digital object by matching the hash value representing the user device that is stored in the smart contract against device information received from the first user's user account. For example, the digital object management system 140 applies a hash function to an identifier of a user device registered to the first user's account. If the resulting value matches the hash value stored in the smart contract (at block 808), the digital object management system 140 determines the first user is properly the owner of the digital object. If the resulting value does not match the hash value stored in the smart contract, the digital object management system 140 may query the first user's user account for any additional device identifiers registered to the account. If no device registered to the account matches the hash value stored in the smart contract (block 808), the digital object management system 140 returns an indication that the first user is not authenticated as the owner of the digital object (block 810).

The digital object management system 140 also authenticates the digital object itself at block 812, based on the object identifier stored in the smart contract. The object identifier can be verified based on records maintained external to the smart contract (such as a database maintained by the marketplace 110) to ensure that the object identifier in the smart contract is not modified. If the digital object is not authenticated at block 814, the digital object management system 140 denies the ownership transfer to the second user.

If the digital object is authenticated at block 814, the digital object management system 140 transfers a token representing the digital object to a wallet associated with the second user at block 816.

At block 818, the digital object management system 140 generates a hash value to represent the user device used by the second user to acquire the digital object. For example, the digital object management system 140 receives and generates a hash of an identifier of the user device when the second user bids to purchase the digital object through the marketplace 110. The resulting hash value is written to the smart contract associated with the digital object. Accordingly, when the second user sells the digital object to a third user, the second user's ownership of the digital object can be verified according to the process depicted in FIG. 8.

Computer System

Figure 9:
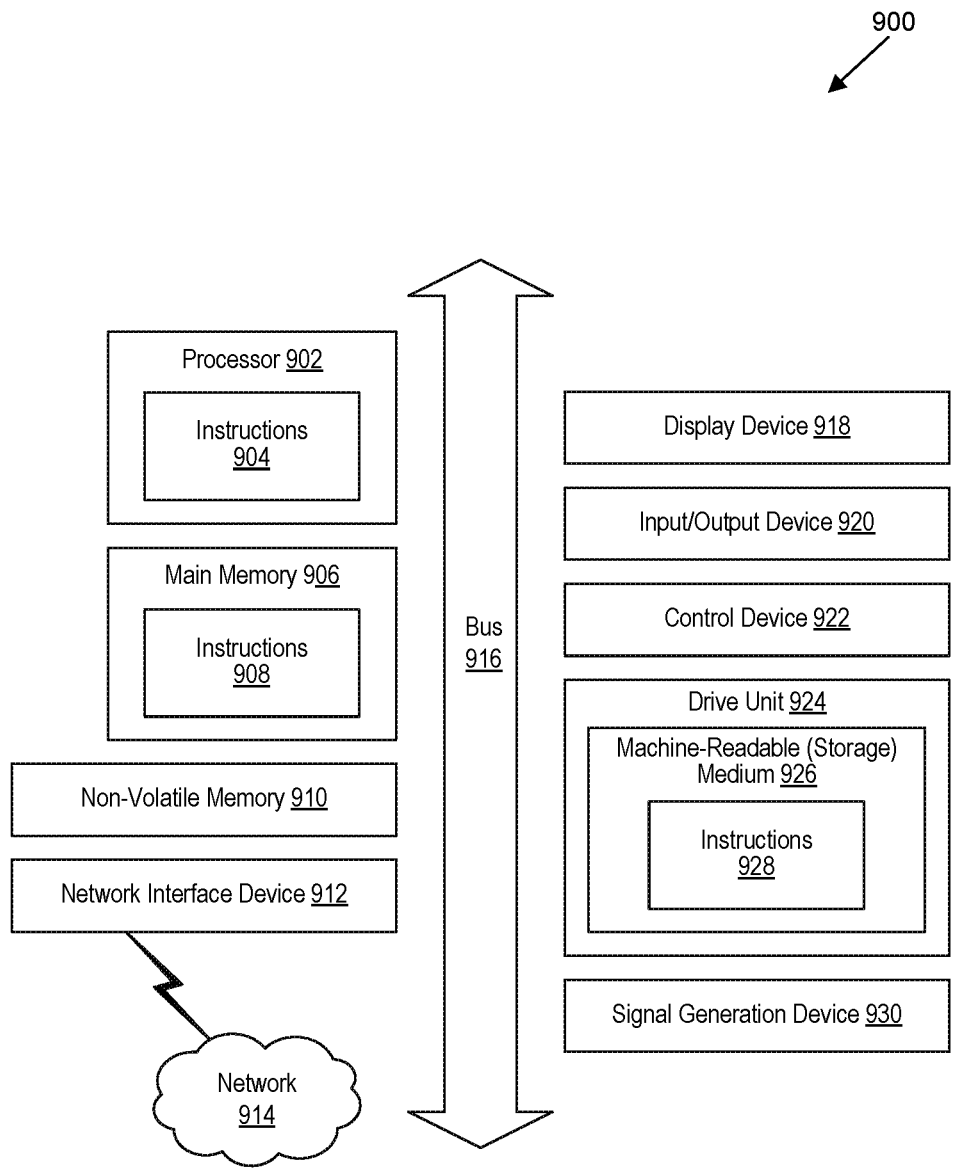
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, video display device 918, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementation, the computer system 900 can be an embedded computer system, a system-on-chip (SOC), a single-board computer system (SBC) or a distributed system such as a mesh of computer systems or include one or more cloud components in one or more networks. Where appropriate, one or more computer systems 900 can perform operations in real-time, near real-time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A non-transitory computer-readable storage medium storing instructions that, when executed by at least one data processor of a system, cause the system to:
   receive a request to transfer ownership of a digital object from a first user to a second user;
      wherein the request is received from a user device of the second user,
      wherein the first user is associated with a user account maintained by a telecommunications service provider, and
      wherein the digital object is associated with a smart contract including a first hash value to represent a user device that was used by a current owner of the digital object to acquire ownership of the digital object;
   retrieve, from the user account of the first user, information identifying a user device associated with the user account of the first user and registered to operate on a telecommunications network maintained by the telecommunications service provider;
   authenticate the first hash value based on the information representing the user device associated with the user account of the first user,
      wherein the information representing the user device associated with the user account of the first user comprises any one or more of a mobile station international subscriber directory number (MSISDN), an international mobile subscriber identity (IMSI), an international mobile equipment identity (IMEI), a media access control (MAC) address, a unique device identifier (UDID), or a device serial number;
   transfer a token representing the digital object to a wallet associated with the second user in response to authenticating the first hash value; and
   store, via the smart contract, a second hash value that represents the user device of the second user.

2. The computer-readable storage medium of claim 1, wherein the instructions when executed by the at least one data processor further cause the system to:
   receive, from a user device used by a third user, a request to generate the smart contract;
   compute a third hash value representing the user device used by the third user; and
   generate the smart contract to represent the digital object, wherein the smart contract when generated includes the third hash value.

3. The computer-readable storage medium of claim 2, wherein generating the smart contract further comprises generating an object identifier that represents a status of the user device used to create the object at a time of object creation, and wherein execution of the instructions further cause the system to:
   authenticate an object identifier in the smart contract against the object identifier generated at a time of creation of the smart contract;
   wherein the token representing the digital object is transferred to the wallet associated with the second user further in response to authenticating the object identifier in the smart contract.

4. The computer-readable storage medium of claim 2, wherein the instructions when executed by the at least one data processor further cause the system to:
   in response to a request received from the third user to list the digital object for sale on a digital object marketplace, generate a sale listing for the digital object;
   wherein the sale listing is associated with a user account of the third user maintained by the telecommunications service provider.

5. The computer-readable storage medium of claim 1, wherein the instructions when executed by the at least one data processor further cause the system to:
   in response to a request received from the first user to list the digital object for sale on a digital object marketplace, generate a sale listing for the digital object;
   wherein receiving the request to transfer ownership of the digital object from the first user to the second user comprises receiving a purchase request associated with the sale listing.

6. The computer-readable storage medium of claim 5, wherein generating the sale listing for the digital object comprises posting the sale listing to the digital object marketplace in response to authenticating the first hash value.

7. The computer-readable storage medium of claim 5, wherein receiving the request to transfer ownership of the digital object from the first user to the second user comprises capturing a user device identifier of the user device used by the second user to submit the purchase request.

8. The computer-readable storage medium of claim 1, wherein the system comprises a digital object operated by the management system telecommunications service provider.

9. A system comprising:
   at least one hardware processor;
   a user account data store storing a user account for each of a plurality of users of an enterprise;
   an ownership authentication module, executable by the at least one hardware processor to cause the at least one hardware processor to:
      receive a request to transfer ownership of a digital object from a first user to a second user;
         wherein the request is received from a user device of the second user, and
         wherein the digital object is associated with a smart contract including a first hash value to represent a user device that was used by a current owner of the digital object to acquire ownership of the digital object;
      retrieve, from the user account of the first user, information identifying a user device associated with the user account of the first user;
      authenticate the first hash value based on the information representing the user device associated with the user account of the first user,
         wherein the information representing the user device associated with the user account of the first user comprises any one or more of a mobile station international subscriber directory number (MSISDN), an international mobile subscriber identity (IMSI), an international mobile equipment identity (IMEI), a media access control (MAC) address, a unique device identifier (UDID), or a device serial number;

transferring a token representing the digital object to a wallet associated with the second user in response to authenticating the first hash value; and a blockchain interface executable by the at least one hardware processor to cause the at least one hardware processor to store, to the smart contract, a second hash value that represents the user device of the second user.

10. The system of claim 9, further comprising:

a digital object generation module executable by the at least one hardware processor to cause the at least one hardware processor to:

receive, from a user device used by a third user, a request to generate the smart contract;

compute a third hash value representing the user device used by the third user; and generate the smart contract to represent the digital object, wherein the smart contract when generated includes the third hash value.

11. The system of claim 10, wherein generating the smart contract further comprises generating an object identifier that represents a status of the user device used to create the object at a time of object creation, and wherein the ownership authentication module is further executable to cause the at least one hardware processor to:

authenticate an object identifier in the smart contract against the object identifier generated at a time of creation of the smart contract;

wherein the token representing the digital object is transferred to the wallet associated with the second user further in response to authenticating the object identifier in the smart contract.

12. The system of claim 10, wherein the digital object generation module is further executable to cause the at least one hardware processor to:

in response to a request received from the third user to list the digital object for sale on a digital object marketplace, generate a sale listing for the digital object;

wherein the sale listing is associated with a user account of the third user maintained by the enterprise.

13. The system of claim 9, wherein the ownership authentication module is further executable to cause the at least one hardware processor to:

in response to a request received from the first user to list the digital object for sale on a digital object marketplace, generate a sale listing for the digital object;

wherein receiving the request to transfer ownership of the digital object from the first user to the second user comprises receiving a purchase request associated with the sale listing.

14. The system of claim 13, wherein generating the sale listing for the digital object comprises posting the sale listing to the digital object marketplace in response to authenticating the first hash value.

15. The system of claim 13, wherein receiving the request to transfer ownership of the digital object from the first user to the second user comprises capturing a user device identifier of the user device used by the second user to submit the purchase request.

16. A method for authenticating ownership of digital objects, the method comprising:

receiving a request to transfer ownership of a digital object from a first user to a second user;

wherein the request is received from a user device of the second user, wherein the first user is associated with a user account maintained by a telecommunications service provider, and wherein the digital object is associated with a smart contract including a first hash value to represent a user device that was used by a current owner of the digital object to acquire ownership of the digital object;

retrieving, from the user account of the first user, information identifying a user device associated with the user account of the first user and registered to operate on a telecommunications network maintained by the telecommunications service provider;

authenticating the first hash value based on the information representing the user device associated with the user account of the first user, wherein the information representing the user device associated with the user account of the first user comprises any one or more of a mobile station international subscriber directory number (MSISDN), an international mobile subscriber identity (IMSI), an international mobile equipment identity (IMEI), a media access control (MAC) address, a unique device identifier (UDID), or a device serial number;

transferring a token representing the digital object to a wallet associated with the second user in response to authenticating the first hash value; and storing, via the smart contract, a second hash value that represents the user device of the second user.

17. The method of claim 16, further comprising:

receiving, from a user device used by a third user, a request to generate the smart contract;

computing a third hash value representing the user device used by the third user; and generating the smart contract to represent the digital object, wherein the smart contract when generated includes the third hash value.

18. The method of claim 17, wherein generating the smart contract further comprises generating an object identifier that represents a status of the user device used to create the object at a time of object creation, and wherein the method further comprises:

authenticating an object identifier in the smart contract against the object identifier generated at a time of creation of the smart contract;

wherein the token representing the digital object is transferred to the wallet associated with the second user further in response to authenticating the object identifier in the smart contract.

19. The method of claim 17, further comprising:

in response to a request received from the third user to list the digital object for sale on a digital object marketplace, generating a sale listing for the digital object;

wherein the sale listing is associated with a user account of the third user maintained by the telecommunications service provider.

20. The method of claim 16, further comprising:

in response to a request received from the first user to list the digital object for sale on a digital object marketplace, generating a sale listing for the digital object;

wherein receiving the request to transfer ownership of the digital object from the first user to the second user comprises receiving a purchase request associated with the sale listing.

\* \* \* \* \*